United States Patent [19]

Siegel

[11] Patent Number: 5,282,349
[45] Date of Patent: Feb. 1, 1994

[54] SEALING AND PACKAGING METHOD AND APPARATUS

[75] Inventor: Martin Siegel, Englewood Cliff, N.J.

[73] Assignee: Weldotron of Delaware, Inc., Wilmington, Del.

[21] Appl. No.: 52,230

[22] Filed: Apr. 23, 1993

Related U.S. Application Data

[63] Continuation of Ser. No. 725,009, Jul. 2, 1991, abandoned.

[51] Int. Cl.⁵ .................. B65B 9/06; B65B 31/04; B65B 51/32
[52] U.S. Cl. .................. 53/433; 53/450; 53/463; 53/550; 156/583.1
[58] Field of Search .................. 53/433, 450, 511, 550, 53/548, 463, 477, 432, 510; 156/555, 583.1

[56] References Cited

U.S. PATENT DOCUMENTS

| | | | |
|---|---|---|---|
| 2,160,367 | 5/1939 | Maxfield | 53/433 |
| 2,371,847 | 5/1945 | Saunders et al. | |
| 2,822,653 | 2/1958 | Zinn, Jr. et al. | 53/373 |
| 2,914,893 | 12/1959 | Berst | |
| 3,007,295 | 11/1961 | Heinzer | |
| 3,166,462 | 1/1965 | Schoder | 53/463 X |
| 3,417,544 | 12/1968 | Grevich | |
| 3,490,981 | 1/1970 | Shanklin | 156/583 |
| 3,653,177 | 4/1972 | Adams et al. | |
| 3,874,976 | 4/1975 | MacFarland, Jr. | 156/515 |
| 3,912,575 | 10/1975 | Zelnick | 156/515 |
| 3,948,720 | 4/1976 | Reil | 156/583 |
| 3,958,390 | 5/1976 | Pringle, Jr. et al. | 53/433 |
| 3,973,372 | 8/1976 | Omori | |
| 4,035,984 | 7/1977 | Gerlach et al. | 53/550 X |
| 4,041,673 | 8/1977 | Brooke et al. | 53/373 |
| 4,144,697 | 3/1979 | Suga | 53/556 |
| 4,219,988 | 9/1980 | Shanklin et al. | 53/550 |
| 4,244,158 | 1/1981 | Nelham | 53/550 X |
| 4,548,024 | 10/1985 | Fine | 53/502 |
| 4,553,377 | 11/1985 | Klinkel | 53/548 |
| 4,630,429 | 12/1986 | Christine | 53/479 |
| 4,650,535 | 3/1987 | Bennett et al. | |
| 4,658,569 | 4/1987 | Hanagata | 53/550 |
| 4,667,552 | 5/1987 | Calligarich | 83/171 |
| 4,722,168 | 2/1988 | Heaney | 53/450 |
| 4,743,333 | 5/1988 | Forthmann | 156/359 |
| 4,807,426 | 2/1989 | Smith | 53/550 |
| 4,872,302 | 10/1989 | van Eijsden et al. | 53/441 |
| 4,895,611 | 1/1990 | Bryniarski et al. | 156/555 X |
| 4,956,963 | 9/1990 | Johnson | 53/442 |
| 5,042,229 | 8/1991 | Hirose | 53/450 |
| 5,056,292 | 10/1991 | Natterer | 53/86 |

Primary Examiner—James F. Coan
Attorney, Agent, or Firm—Davis Hoxie Faithfull & Hapgood

[57] ABSTRACT

A horizontal form fill packaging and sealing apparatus comprises a film dispenser and a film forming plow which, together with a roller guide, forms the film to be sealed into a tube with the free edges at the side. The object to be packaged is inserted into the film tube. The free edges of the film are longitudinally sealed together at the side of the package by a rotary heat sealer and immediately cooled to approximate impulse sealing, and a cross seal is made at the front and back of the object to be packaged. The excess gas in the package is pressed out by a presser before the back cross seal is made.

53 Claims, 6 Drawing Sheets

SEALING AND PACKAGING METHOD AND APPARATUS

This is a continuation of copending application(s) Ser. No. 07/725,009 filed on Jul. 2, 1991, now abandoned.

FIELD OF THE INVENTION

The present invention relates to the field of packaging methods and devices, and more particularly to form fill packaging and sealing machines and methods.

BACKGROUND OF THE INVENTION

Companies involved in the packaging of foods have traditionally had two main concerns: 1) packaging the food item in such a manner that it has a long shelf life, and 2) avoiding package leakage. Shelf life has always been important and is becoming more so with the increased sale of highly processed and cooked foods which spoil relatively quickly. Increasing shelf life has numerous advantages, including ease of distribution, improved product appearance, and most importantly safety, by maintaining the freshness of the product for an extended period. Product leakage relates to the leakage of fluids, primarily from meat products. Products which leak obviously present aesthetic and handling problems.

A recently developed technology for increasing shelf life and avoiding leakage is that of modified atmosphere packaging, or MAP, also known as controlled atmosphere packaging, or CAP. MAP packaging involves hermetically sealing the product with an appropriate type of shrink barrier film, meaning a film that is impervious to selected gases. Many types of co-extruded multilayer shrink barrier films are commercially available. The film is shaped to form a package with the product inside, and the air is flushed out of the package and replaced with a gas or mixture of gases that is inert to the product and that retards spoilage. The modified atmosphere in the package increases shelf life, and the barrier film and hermetic sealing ensure that the modified atmosphere will not change significantly over time. The hermetic seal is, of course, leakproof.

Prior art MAP machines typically are of the form fill type, meaning the film used to package the product is formed to receive the product and the product fills the film thus formed. Some form fill machines are horizontal, meaning the packages move through the machines horizontally, while others are vertical. The film is usually formed in the shape of a tube, and after the product enters the tube a longitudinal seal known as a lap seal is made, in horizontal machines, along the bottom of the package. In vertical machines, the lap seal is made along the back of the package; the term "bottom" as used herein will be understood to include the back of packages in vertical machines. Cross seals are then made at the front and rear of the package. Products packaged in this manner sometimes experience capillary leakage at the points where the cross seals and the longitudinal lap seal intersect, since sealing must take place through a multiplicity of film layers at these points. This capillary leakage can shorten the shelf life of the product and can result in an unsafe condition if product spoilage goes undetected. The intersections of cross seals and lap seal also tend to be unsightly.

In addition to poor sealing, lap sealing also leaves less room on the package for printing nutrition information, recipes, and the like. Government regulations mandate that a certain distance be maintained between printed material and seals; since a lap seal is in the center of the bottom of the package, essentially none of the bottom portion of the package can be used for printing. Also, since the lap seal is disposed on a major flat surface of the product, it is prone to catching during handling which can result in a tear or leak.

The aesthetic and printing space problems associated with lap seals in MAP systems are also present in other form-fill shrink film applications and in form-fill stretch and stretch/shrink film packaging systems. Stretch and stretch/shrink film systems have additional problems as well. Such systems usually package a product by making a lap seal and leaving large flaps of excess film at the front and rear of the product. These flaps of film are then folded around the product and heated to cause them to stick to the film on the bottom of the product. A hermetic seal is not usually sought in these applications; nevertheless, the package must still be leakproof. A large amount of excess film is used for the flaps to avoid leakage, increasing the expense of such systems, but leakage often continues to be a problem.

It has been found that heat seals are more effective if the film is preheated before sealing. However, prior art sealing machines have not had an effective or convenient way of preheating the film.

OBJECTS AND SUMMARY OF THE INVENTION

It is therefore an object of the present invention to overcome the shortcomings of prior art form fill packaging and sealing machines and methods.

It is a further object of the invention to eliminate capillary or other leakage at the intersection of a cross seal and a longitudinal seal in a form-fill package.

It is a further object of the invention to allow more room for printed material on a longitudinally sealed package.

It is a further object of the invention to provide an aesthetically pleasing cross sealed and longitudinally sealed package.

It is a further object of the invention to provide a package whose longitudinal seal is less likely to catch during handling.

It is a further object of the invention to eliminate leakage in packages formed of stretch film.

It is a further object of the invention to conserve film in stretch and stretch/shrink film wrapping applications.

It is a further object of the invention to provide an effective and convenient way of preheating film before sealing.

In accordance with a first aspect of the present invention, a sealing and packaging apparatus and method employs a film dispenser and a film forming device for receiving the film from the dispenser and for forming an enclosure into which an item to be packaged is inserted. The item together with the surrounding film forms a package. A first sealer forms a first seal in the film in a plane, and a second sealer forms a second seal in the film substantially perpendicular to the first seal and in substantially the same plane as the first seal, whereby the second seal is through substantially two layers of film at its intersection with the first seal.

In accordance with a second aspect of the invention, a form fill sealing and packaging apparatus and method employs a film dispenser and a forming device for forming the dispensed film into an enclosure into which an item to be packaged is placed. The film is formed in such a way that the opposite edges of the film meet, and the item and the film form a package. A first sealer longitudinally seals the opposite edges of the film at the side of the package, and a second sealer cross seals the film approximately perpendicular to the longitudinal seal at the end of the package, whereby the longitudinal seal made by the first sealer and the cross seal made by the second sealer intersect at a corner of the package.

In accordance with a third aspect of the invention, an apparatus and method for packaging food items in a modified gaseous atmosphere employs a barrier film dispenser and a forming device for receiving the film from the dispenser and forming the film into a tube into which an item is placed. The film is formed such that the edges of the film are oriented at the side of the item. A gas flush system flushes out the air in the tube and replaces it with a predetermined gas or mixture of gases. A longitudinal sealing device forms a substantially hermetic longitudinal seal in the edges of the film at the side of the item, and a cross sealing device forms a substantially hermetic cross seal in the film at an angle to the longitudinal seal.

Specifically, and in a principal embodiment, a horizontal form fill packaging apparatus for sealing an item in a package of film comprises a film dispenser for dispensing folded film and a film forming plow disposed adjacent to the film dispenser for receiving the dispensed film and spreading apart the two layers of the film in preparation for the reception of the item. An input conveyor is disposed adjacent to the film forming plow for depositing the item between the film layers, the item and film layers forming a package. Means are provided for moving the package through the packaging apparatus. A guide is disposed at the side of the package to catch the edges of the film and bring the edges together, thereby forming the film layers into a closed tube around the item. A rotary thermal sealer is disposed adjacent to the guide, and forms a continuous longitudinal seal in the edges of the film. A cooling roller is disposed adjacent to the rotary thermal sealer, and cools the longitudinal seal soon after the longitudinal seal is made to thereby approximate a hermetic longitudinal seal. A cross sealer is oriented to form a cross seal in the film layers after the longitudinal seal is made, the cross seal being substantially perpendicular to and in the same plane as the longitudinal seal, whereby the intersection of the longitudinal seal and the cross seal is located in the corner of the package through substantially two layers of the film.

In accordance with a further aspect of the invention, a sealing apparatus for heat sealing film comprises an intake roller and a first sealing roller pressed against the intake roller at a first point. A second sealing roller is pressed against the first sealing roller at a second point, where the film is sealed through heat and pressure. The film enters the apparatus at the first point, and is pressed against the first sealing roller between the first and second points before being sealed at the second point, thereby preheating the film before sealing.

In accordance with a further aspect of the invention, a method for packaging an item comprises surrounding the item with a sheet of film thereby forming a package having at least one open end and an open longitudinal seam formed by the opposite edges of the sheet of film, sealing the longitudinal seam by pressing the edges against each other and applying heat, and sealing the open end in a linear cross seal through pressure and heat, such that the longitudinal seal intersects the cross seal at one end of the cross seal, whereby the intersection of the longitudinal seal and the cross seal forms a corner of the package.

BRIEF DESCRIPTION OF THE DRAWINGS

These and other objects, aspects, and embodiments of the present invention will be described with reference to the following drawing figures, of which.

DETAILED DESCRIPTION OF THE INVENTION

Figure 1:
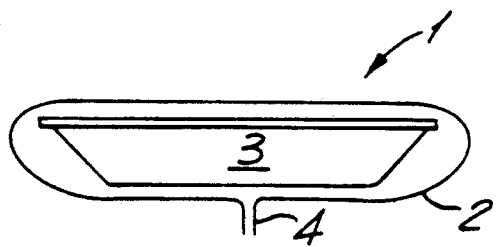
FIG. 1 is a view in cross section of a tube of sealing film formed in prior art sealing apparatuses.
Figure 2:
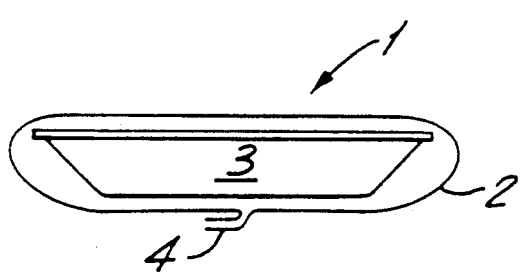
FIG. 2 is a view in cross section of the tube of sealing film of FIG. 1, with the lap seal folded underneath the package.

Referring first to FIGS. 1 to 3A, a package 1 produced by a typical horizontal prior art form fill packaging and sealing machine comprises a tube of film 2 formed around a product 3. The film 2 is formed such that the edges of the film meet in a longitudinal seam along the center of the bottom of the package. The edges of the film 2 are longitudinally sealed forming a lap seal 4, and, as shown most clearly in FIG. 2, the lap seal 4 is folded under the package 1. Cross seals 5 are then made at the ends of the package 1, intersecting with the lap seal 4 at approximately the centers of the cross seals 5. If the film 2 is heat shrink film, the package then goes through a heat shrink tunnel, resulting in the package 1 shown in FIG. 3A. It can be seen from FIGS. 2 to 3A that at the point of intersection with the lap seal 4, the cross seals 5 must be made through four layers of film, plus any additional layers which may be interposed through folds in the film 2 which may arise due to slack in the film. The strength of the seal is inversely proportionate to the number of layers of film sealed through; the points at which the lap seal 4 and the cross seals 5 intersect, therefore, are subject to capillary leakage. Additionally, printed material cannot be placed on the bottom of the product because of the location of the lap seal 4.

Figure 4:
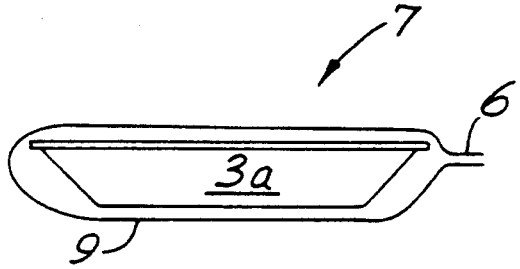
FIG. 4 is a view in cross section of an example of a tube of sealing film formed according to the present invention.
Figure 3:
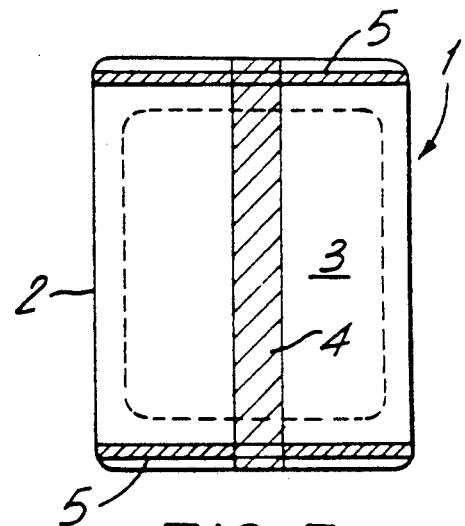
FIG. 3 is a bottom plan view of a package formed from the tube of sealing film of FIG. 2.
Figure 3A:
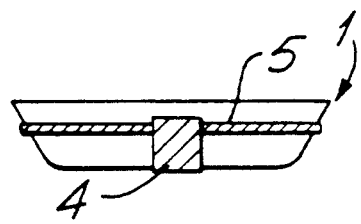
FIG. 3A is a side elevational view of the package of FIG. 3 after the film has been shrunk around the product.
Figure 5:
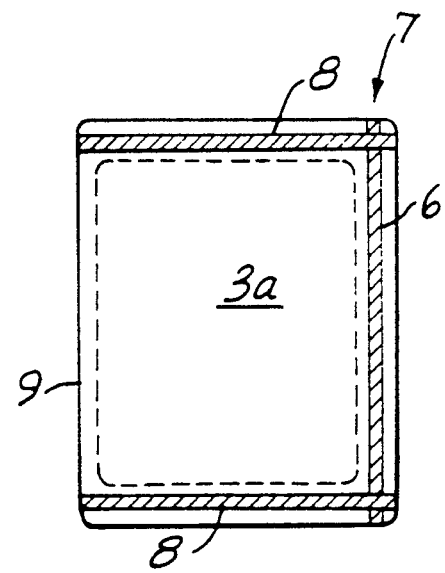
FIG. 5 is a bottom plan view of a package formed from the tube of sealing film of FIG. 4.
Figure 5A:
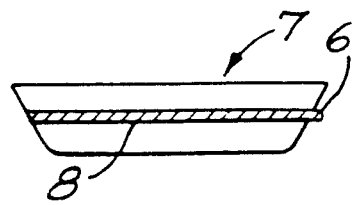
FIG. 5A is a side elevational view of the package of FIG. 5 after the film has been shrunk around the product.

In contrast, as shown in FIGS. 4 to 5A, the present invention produces a package 7, including a product 3a and film 9, having a longitudinal seal 6 on one of its sides instead of on the bottom. Two cross seals 8 are made in the usual locations at the ends of the package 7. Since the longitudinal seal 6 is made on the side of the package 7, the cross seals 8 are made in approximately the same plane as the longitudinal seal 6, and hence there is no need to fold the longitudinal seal 6 under the package which would create more layers of film to seal through. The cross seals 8 are therefore made through only two layers of film, even at the intersections of the longitudinal and cross seals which occur at two corners of the package 7. Capillary leakage is therefore substantially reduced at those points. The location of the longitudinal side seal 6 also allows room on the bottom of the package 7 for printed material and produces a more aesthetically pleasing package. The location of the longitudinal seal 6 also reduces the likelihood that the seals will catch during handling, since none of the seals is located on a major flat surface of the product, as shown in FIG. 5.

Figure 6:
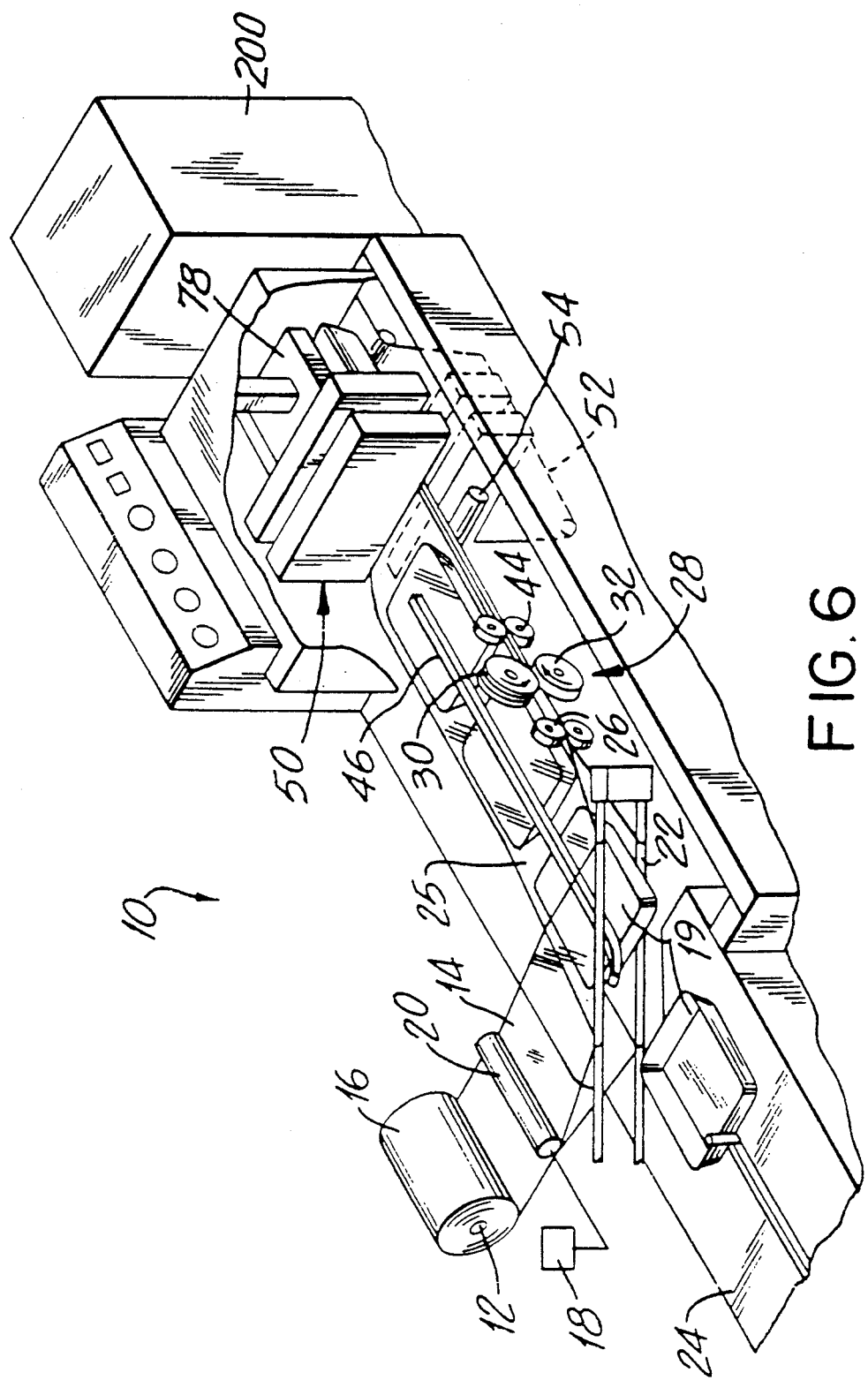
FIG. 6 is a perspective view of an example of a form fill packaging and sealing apparatus according to the present invention.
Figure 8:
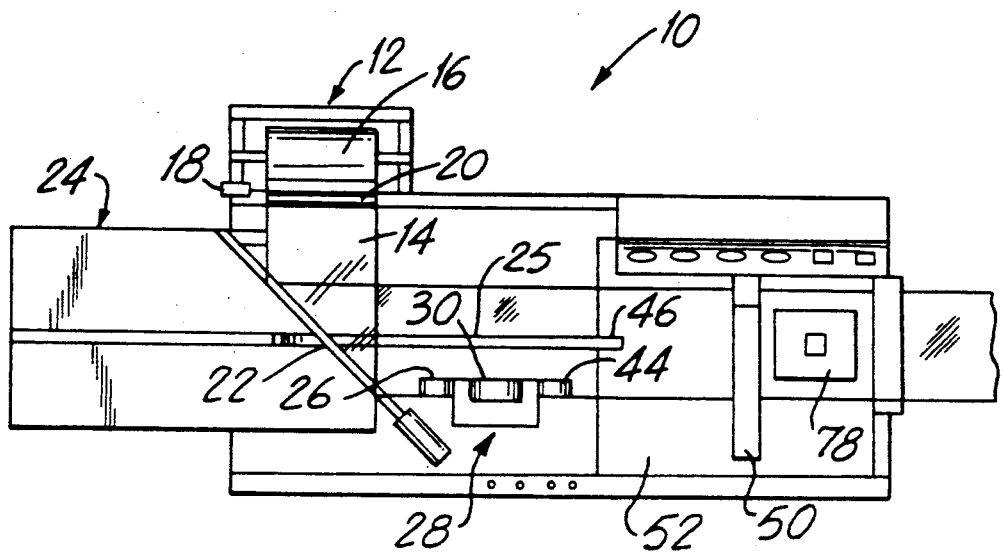
FIG. 8 is a top plan view of the form fill packaging and sealing apparatus of FIG. 6.
Figure 7:
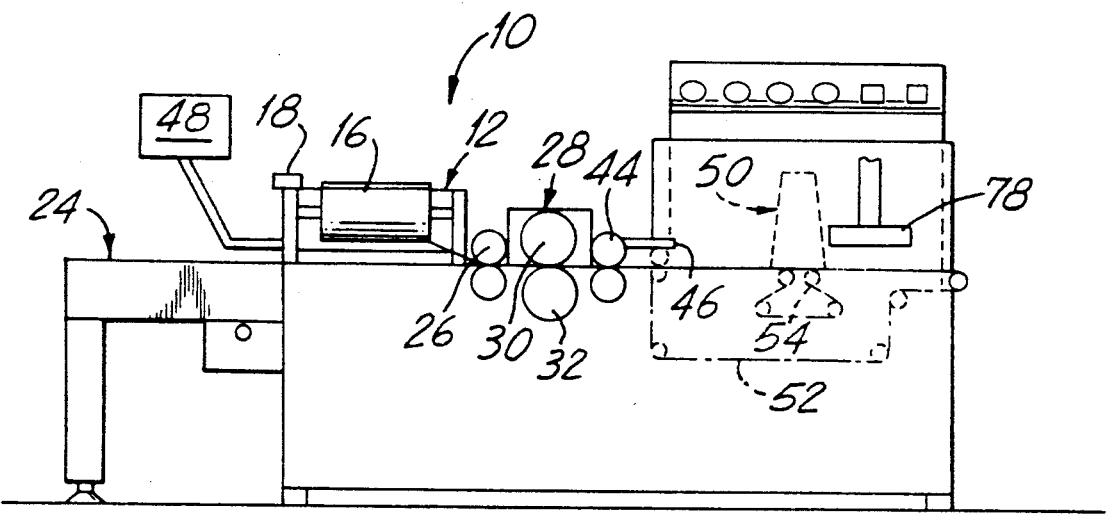
FIG. 7 is a front elevational view of the form fill packaging and sealing apparatus of FIG. 6.

Referring now to FIGS. 6 to 8, the present invention is shown in connection with a form fill packaging and sealing machine 10. The machine 10 is of the continuous flow and horizontal type, and has moderate speeds of up to 40-60 packages per minute. It will be appreciated, however, that the present invention can be used in other sealing apparatuses as well, including, but not limited to, vertical form fill machines. The machine 10 is intended to be used primarily for MAP packaging using barrier films, but other types of shrink films may also be used if desired. It has also been found that stretch films can advantageously be used with the machine 10 to economize film, as will be further described below.

A film dispenser 12 situated behind the machine 10 dispenses center-folded heat-sealable film 14 from a roll of film 16. As shown, the dispenser 12 is used with previously center-folded film, but single wound film may also be used with appropriate modifications to the dispenser 12, as is known in the art. When the machine 10 is used for MAP applications, the film 14 is preferably one of many types of commercially available coextruded multilayer shrink barrier films.

If the film 14 is printed, an electronic detector 18, located on the film dispenser 12, is used to ensure that the film 14 registers with the objects to be packaged, "register" meaning properly aligning the print on the film 14 with the items 19 to be packaged. Devices other than the detector 18 may be used to accomplish the same function, as is known in the art.

One or more roller guides 20, used to ensure that the film 14 leaves the film dispenser 12 sufficiently straight and taut, are disposed in front of the film roll 16. A film forming plow 22 is located in front of the roller guide 20. The film forming plow 22 turns the path of the film 14 a right angle and spreads the film layers apart, causing the fold in the film 14 to be disposed toward the back of the machine 10 and readying the film 14 to receive an item 19, shown in FIG. 6. A flighted chain lug conveyor 24 transfers the item 19 to the film forming plow 22 between the top and bottom layers of the film 14, and registers the placement of the items 19 so that the cross seal of the machine 10 will occur in the proper place between the items 19. Alternatively, the products may be fed manually by an operator. A conveyor belt 25 carries the items 19, with their surrounding film 14, from the plow 22 to the other sections of the machine 10.

A roller guide 26 at the free edges of the film 14 is used to catch the edges of the film 14 and form the film into a tube around the items 19. The roller guide 26 is disposed downstream from the plow 22, "downstream" as used herein meaning farther along the direction in which the package moves through the machine 10. The guide 26 is angled slightly toward the front of the machine 10 to pull the film 14 tight in order to avoid folds caused by slackness, and to align the edges of the film. The edges of the film then move into a longitudinal seal section, indicated generally at 28. The longitudinal seal section 28 includes a heated sealing roller 30 pressed against a sealing bed roller 32, the interaction of which effects a continuous thermal seal in the edges of the film 14, to the side of the item 19.

A cooling roller assembly 44 is located downstream from the rollers 30 and 32 to cool the seal immediately after it is made. Although the seal made by the longitudinal seal section 28 is technically a thermal seal, it approximates an impulse seal since the seal is cooled by the cooling roller assembly 44 soon after it is made. The seal thus is hermetic, or nearly so. If desired, the excess film can be trimmed from the seal, as is known in the art.

Figure 9:
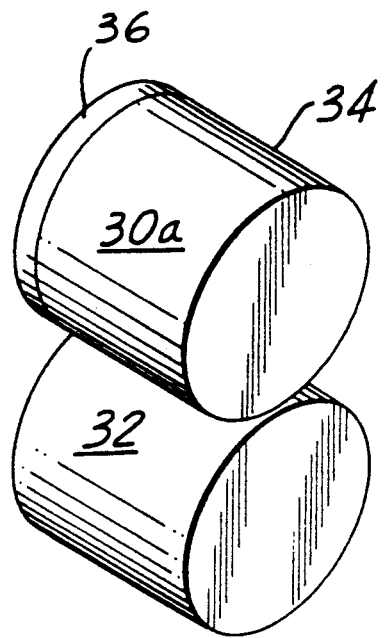
FIG. 9 is a perspective view of an example of a side sealing roller used in the form fill packaging and sealing apparatus of FIG. 6.
Figure 10:
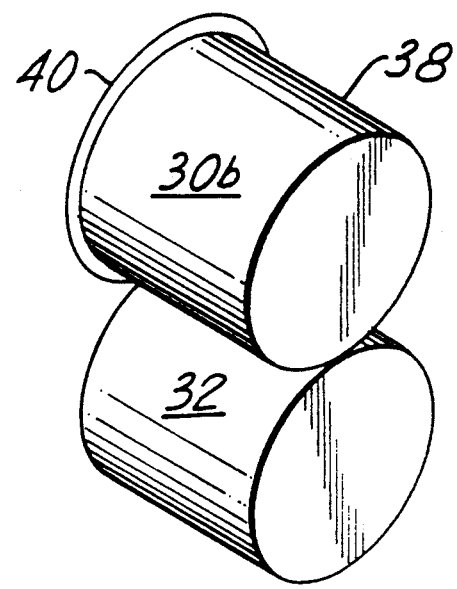
FIG. 10 is a perspective view of another example of a side sealing roller used in the form fill packaging and sealing apparatus of FIG. 6.
Figure 11:
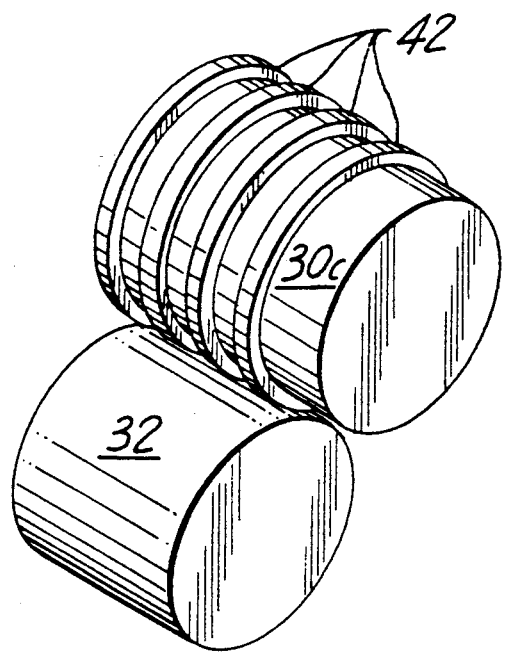
FIG. 11 is a perspective view of yet another example of a side sealing roller used in the form fill packaging and sealing apparatus of FIG. 6.

Different types of sealing rollers 30 may be used, as desired, three of which are depicted in FIGS. 9 to 11. In FIG. 9, a sealing roller 30a has a heating section 34 and a flat sealing edge 36. The heating section 34 heats the sealing edge 36, and the sealing edge 36 seals the film 14 against the sealing bed 32. In FIG. 10, a sealing roller 30b has a heating section 38 and a sharp sealing edge 40. The sharp sealing edge 40 accomplishes a narrower seal than the flat sealing edge 36 in FIG. 9. In FIG. 11, a sealing roller 30c comprises four flat sealing sections 42 spaced apart from each other, each of which performs a separate seal.

Figure 12:
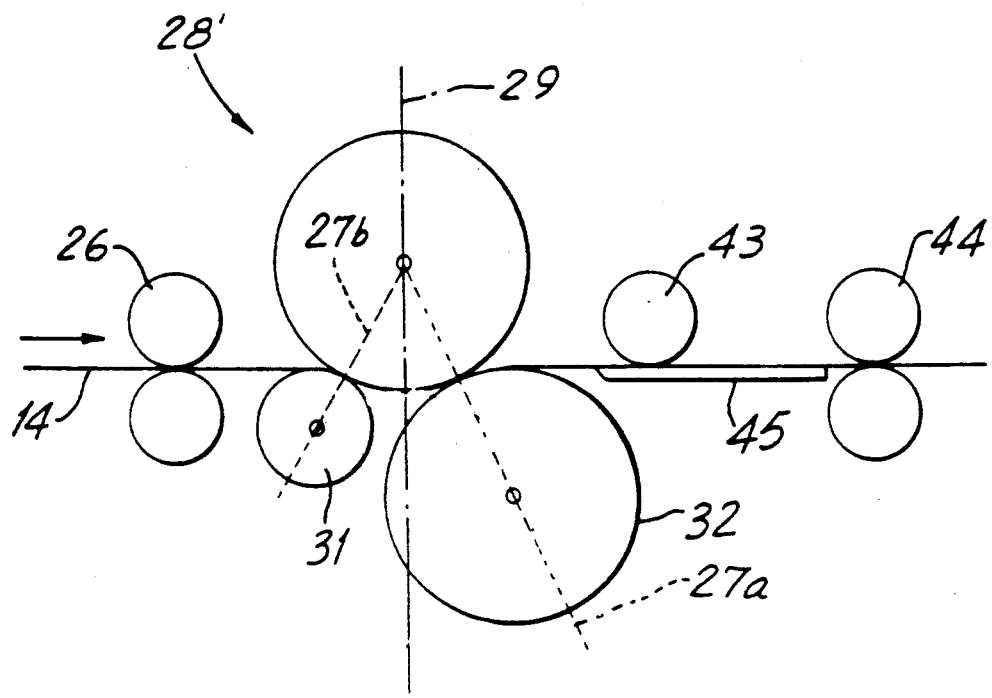
FIG. 12 is a side elevational view of an example of a longitudinal sealing apparatus according to the invention which preheats the film before sealing.

Referring now to FIG. 12, an alternative longitudinal seal section 28', referred to as a planetary seal section, provides for preheating of the film before sealing. In the planetary seal section 28', the sealing roller 30 is not located directly above the sealing bed roller 32, as in FIGS. 6 to 8. Rather, the rollers 30 and 32 are disposed at an angle of up to approximately 15 degrees from vertical in the preferred embodiment. The angle is shown by the dotted line 27a going through the centers of the rollers 30 and 32, compared to the vertical dashed line 29. An intake roller 31 presses against the sealing roller 30, and is disposed at an opposite and equal angle from vertical to the sealing bed roller 32, as shown by the dotted line 27b compared to the vertical dashed line 29. A roller guide 26 is located as in FIGS. 6 to 8.

The film 14 to be sealed by the planetary sealing section 28' goes through the roller guide 26 in the direction of the arrow and is pressed between the intake roller 31 and the sealing roller 30. Between that point and the point at which the film is sealed between the sealing roller 30 and the sealing bed 32, shown by the dotted lines 27b and 27a, the film is pressed against the heated sealing roller 30, preheating the film in preparation for sealing. It will be appreciated that the angles of the intake roller 31 and the sealing bed 32 may be varied jointly or separately, as desired, to shorten or lengthen the amount of time the film is preheated.

A cooling roller 43 pressing against a cooling plate 45 is disposed downstream from the rollers 30 and 32, and a cooling roller assembly 44 is located as in FIGS. 6 to 8. The cooling roller and plate 43 and 45, both of which are water chilled in a preferred embodiment, serve as an alternative and/or additional cooling apparatus. After sealing, the film 14 travels between the cooling roller 43 and cooling plate 45 and cooling roller apparatus 44.

Figure 13:
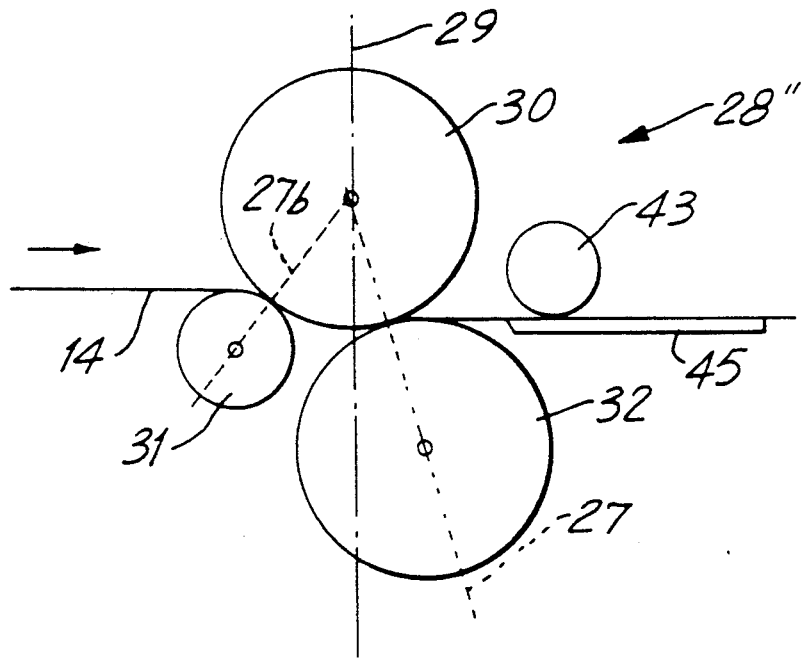
FIG. 13 is a side elevational view of a second example of a longitudinal sealing apparatus according to the invention which preheats the film before sealing.

Referring now to FIG. 13, the planetary sealing section 28" shown in similar to the sealing section 28' except that the sealing section 28" does not include a roller guide or cooling roller assembly. As shown, the intake roller 31 pressing against the sealing roller 30 serves as a roller guide, and cooling of the seal is carried out entirely by the cooling roller and plate 43 and 45. The sealing section 28" also differs from the sealing section 28' in that the intake roller 31 is disposed at a greater angle from vertical than the sealing bed roller 32. This arrangement is just as effective in preheating the film, but causes the level of the film entering the seal section 28" to be higher than the level of the film exiting the same.

The types of sealing rollers shown in FIGS. 9 to 11 can also be used in the planetary sealing sections 28' and 28". Additionally, in the preferred embodiment, the longitudinal sealing section 28 or the planetary sealing section 28' or 28" is height adjustable to adjust to different package heights, enabling sealing of the film at the midpoint of the height of the package. The seal section 28, 28', or 28" is also laterally adjustable to accommodate different package widths.

Referring again to FIGS. 6 to 8, when the machine 10 is used for MAP packaging, a gas nozzle 46 is placed between the layers of film 14, ending at a point slightly downstream from the longitudinal seal section 28. As shown in FIG. 7, the gas nozzle 46 is connected to a gas flush system 48. The nozzle 46 and flush system 48 flush the air out of the tube formed by the longitudinally sealed layers of film 14, and distribute $CO_2$, $NO_2$, or other inert gas into the tube to a predetermined level, in a well known manner. The type of gas used depends on the characteristics of the barrier film used and the type of product being packaged.

A cross sealer, indicated generally at 50, is disposed downstream from the gas nozzle 46. The cross sealer 50 is of the box motion type, meaning it moves downstream with the packages being sealed while it forms a cross seal, so as not to interrupt the flow of the machine 10. After the cross seal is formed, the cross sealer 50 moves upstream to start the next cross seal. Before encountering the cross sealer 50, the packages are transferred from the conveyor belt 25 to a second conveyor belt 52 which is mounted to the cross sealer 50 on rollers 54. The rollers 54 move back and forth with the cross sealer 50, allowing the conveyor belt 52 to move the packages downstream to the cross sealer 50 while accommodating the back and forth movement of the latter, in a well known manner.

Figure 14:
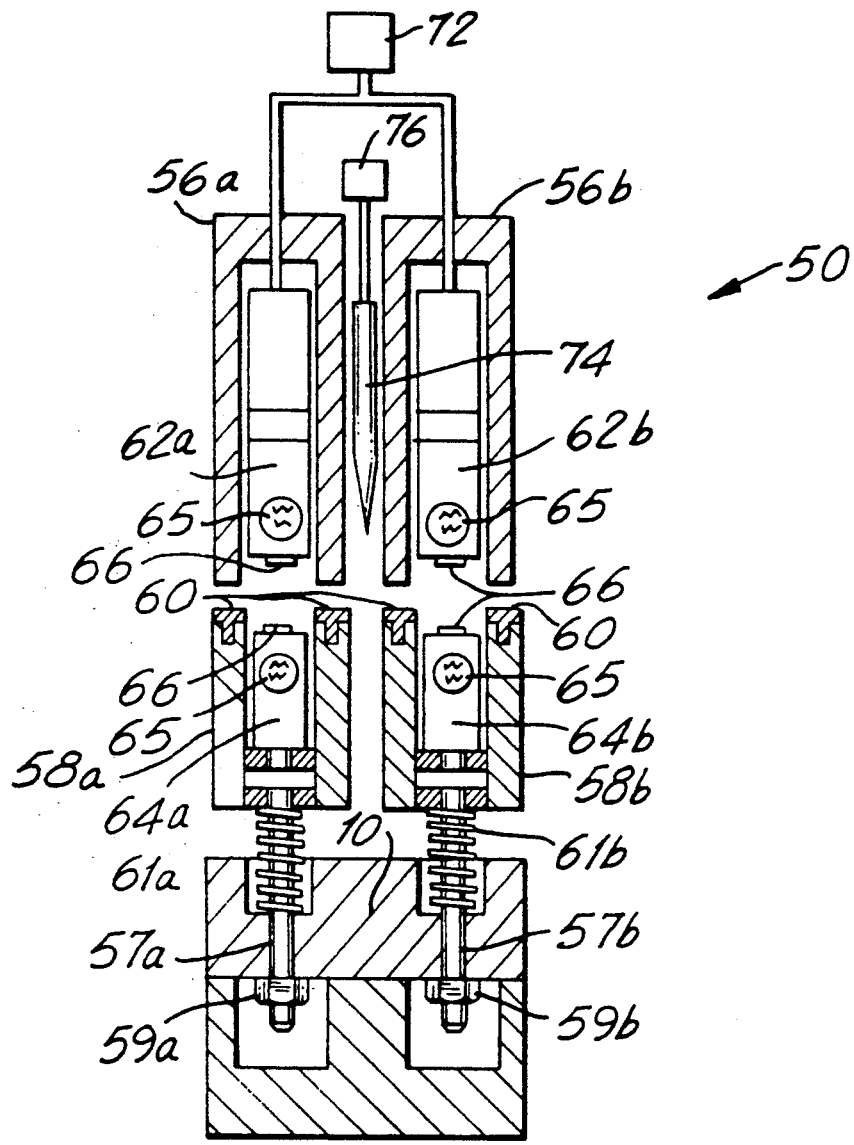
FIG. 14 is a view in cross section of the cross sealer used in the form fill packaging and sealing apparatus of FIG. 6.

Referring now to FIG. 14, which shows the cross sealer 50 in more detail, the cross sealer 50 comprises a pair of upper U-shaped seal bars 56a and 56b, and a pair of lower U-shaped seal bars 58a and 58b. Rods 57a and 57b extend from the bottom of seal bars 58a and 58b, respectively, into the machine 10. Springs 61a and 61b are mounted between the seal bars 58a and 58b and the machine 10 on the rods 57a and 57b. Cross pieces 59a and 59b are mounted on the ends of the rods 57a and 57b to limit the movement of the latter. Rubber grippers 60 are installed on the edges of the lower seal bars 58a and 58b. Sealing element assemblies 62a and 62b are mounted in the upper seal bars 56a and 56b, and sealing element assemblies 64a and 64b are mounted in the lower seal bars 58a and 58b. Each of the sealing element assemblies has a cooling passage 65 through which flows cooling liquid.

Sealing elements 66, comprising nichrome ribbons in the preferred embodiment, are disposed in opposing relationship on each of the element assemblies 62a,b and 64a,b. Each sealing element 66 is spring loaded at the ends of the element assembly upon which it is mounted (spring loading not shown), to allow for thermal expansion of the elements 66 during sealing. The sealing elements 66 are coated with a suitable material, such as TEFLON, to keep them from sticking to the film 14 during sealing. Preferably, a film (not shown) made of polyamide or other suitable material is placed between the sealing elements 66 and the element assemblies 62a,b and 64a,b. Polyamide film electrically insulates the elements 66 from the element assemblies 62a,b and 64a,b, but thermally conducts, allowing the element assemblies to act as heat sinks to cool the elements 66 quickly in order effectively to carry out impulse sealing.

In operation, vertical motion is imparted to the upper seal bars 56a and 56b in a well known manner to lower them onto the lower seal bars 58a and 58b, such that the edges of the upper seal bars 56a and 56b abut the grippers 60 and push the lower seal bars 58a and 58b downward slightly against the springs 61a and 61b, until the grippers 60 are approximately level with the top of the lower sealing element assemblies 64a and 64b. The seal bars 56a,b and 58a,b are now in sealing position. An air cylinder assembly 72 is attached to the upper element assemblies 62a and 62b to press them against the lower element assemblies 64a and 64b, thus pressing the elements 66 together, sealing the film between them.

A blade 74 is vertically disposed between the upper seal bars 62a and 62b for cutting the film between the seal bars after sealing is completed. An air cylinder assembly 76 is attached to the blade 74 to lower and raise the latter. Preferably, a proximity switch or like device (not shown) is provided to keep the upper element assemblies 62a and 62b from inadvertently pressing against the lower element assemblies 64a and 64b before the seal bars 56a,b and 58a,b are in sealing position, as is known in the art.

Referring again to FIGS. 6 to 8, a presser 78 is disposed downstream from the cross sealer 50 to press out the excess gas in the package just before the rear cross seal is made. The presser 78 is especially desirable in MAP packaging. Since the package is sealed hermetically in MAP applications, there is no way for excess gas to escape while the film is being shrunk around the package in a heat shrink tunnel or like device.

As mentioned above, if the machine 10 is used for MAP packaging or other packaging using heat shrink film, a heat shrink tunnel 200 is provided at the end of the machine 10. If the machine 10 is used with stretch or stretch/shrink film, the excess film from the front and rear of the package is folded around the product, as is known in the art. When used with stretch or stretch/shrink films, the machine 10 produces a hermetically sealed leakproof package without the need for large flaps to be folded under the product. Relatively small flaps may therefore be used, which are folded under solely for the sake of appearance. The machine 10 thus uses less film than typical stretch or stretch/shrink film sealing machines, which results in corresponding savings.

In operation of the machine 10, the film 14 is dispensed from the roll of film 16 by the dispenser 12, and goes through the film forming plow 22 where it is oriented to receive an item 19. The lug conveyor 24 places the item 19 between the film layers. The item 19 and attending film 14 are then conveyed by the conveyor 25 to the longitudinal seal section 28, where the roller guide 26 catches the free edges of the film 14 at the side of the item 19 and pulls the film 14 taut. The edges then enter the sealing roller 30 and sealing bed roller 32, where they are heat sealed together. The seal is quickly cooled by the cooling roller assembly 44 to approximate impulse sealing. A sealed tube of film 14 is thus formed, and the gas nozzle 46 supplies inert gas while flushing the air out of the tube.

The item 19 and film 14 are then conveyed to the cross sealer 50 where the film 14 in front of the item 19 is sealed. The upper seal bars 56a and 56b are lowered into sealing position onto the lower seal bars 58a and 58b, and the air cylinder assembly 72 presses the upper element assemblies 62a and 62b against the lower element assemblies 64a and 64b, pressing the layers of film 14 between the upper and lower sealing elements 66, which are cool when they are first brought together. The elements are then pulsed for a preset duration (preferably between 50 and 500 milliseconds, depending on the speed that the objects are moving through the machine 10 and the type of film used) and allowed to cool, and the element assemblies 62a,b and 64a,b and seal bars 56a,b and 58a,b are separated after the blade 74 cuts the film 14 between the seals. The item 19 then moves through the cross sealer 50, and just before the rear cross seal is made, the presser 78 presses the excess gas out of the package.

After the sealing of the package is complete, the package is conveyed to a heat shrink tunnel or to apparatus for folding the front and rear flaps of film against the package, depending on whether shrink film or stretch film is used.

The foregoing description is not meant to limit the invention to the specific embodiments described. Other embodiments and variations of the invention will be apparent to those skilled in the art. Although described by reference to MAP, shrink, stretch, and stretch/shrink film applications, the invention can be used in other sealing applications involving sealing a film at an angle to and over a seal previously made, as will be appreciated by those skilled in the art.

I claim:

1. A sealing and packaging apparatus, comprising:
a film dispenser;
a film forming device for receiving said film from said dispenser and for forming an enclosure into which an item to be packaged is inserted, said item together with said surrounding film forming a package;
a first sealer for forming a first seal in said film in a plane, after said package has been formed; and
a second sealer for forming a second seal in said film substantially perpendicular to said first seal and in substantially the same plane as said first seal, whereby said second seal is through substantially two layers of film at its intersection with said first seal;
wherein said first sealer comprises a rotary thermal sealer immediately followed by a cooling roller assembly.

2. The apparatus of claim 1, further comprising means for modifying and controlling the gaseous atmosphere in said package.

3. The apparatus of claim 1, wherein said preheater includes a heated sealing roller having a first axis of rotation and a sealing bed roller having a second axis of rotation, the edges of said film adapted to be pressed together between said sealing roller and said sealing bed roller at a sealing point along a line connecting said first axis of rotation and said second axis of rotation to thereby seal said film edges, said sealing roller and said sealing bed roller being configured such that said film edges are in thermal contact with said sealing roller prior to said sealing point, said sealing roller thereby preheating said film edges prior to sealing said edges at said sealing point.

4. The apparatus of claim 1, wherein said rotary thermal sealer comprises a first seal roller pressing against an intake roller, and a second seal roller pressing against said first seal roller, whereby said film is preheated on said first seal roller between said intake roller and said second seal roller before being sealed between said first and second seal rollers.

5. The apparatus of claim 1, wherein said cooling assembly comprises a cooling roller pressed against a cooling plate.

6. The apparatus of claim 1, wherein said first sealer and said second sealer form substantially hermetic seals in said film.

7. The apparatus of claim 1, wherein said film is folded upon leaving said film dispenser, and wherein said forming device comprises a film forming plow for spreading the layers of said folded film to facilitate reception of said item between said layers, and a guide adapted to press the free edges of said film together, forming said film into a tube.

8. The apparatus of claim 1, wherein said second sealer comprises a pair of seal bars, each containing a seal assembly having a sealing element thereon, said seal bars adapted to press against one another, clamping said film between them, and said seal assemblies adapted to seal said film by pressing said film between said sealing elements and heating said heating elements.

9. The apparatus of claim 1, wherein said plane is horizontal.

10. The apparatus of claim 1, wherein said first seal comprises a longitudinal seal in said film along a first side of said package, and wherein said second seal comprises a cross seal along a second side of said package, whereby said first and second seals intersect at a corner of said package.

11. The apparatus of claim 1, wherein said seals are not disposed on any major flat surface of said package.

12. The apparatus of claim 1, wherein said film comprises barrier shrink film.

13. The apparatus of claim 3, wherein said preheater further includes an intake roller positioned upstream of said sealing bed roller and adapted to place said film edges in thermal contact with said sealing roller upstream of said sealing point.

14. A form fill sealing and packaging apparatus, comprising:
   a film dispenser;
   a forming device for forming said dispensed film into an enclosure into which an item to be packaged is placed, said film being formed in such a way that the opposite edges of said film meet, said item and said film comprising a package;
   a first sealer for longitudinally sealing said opposite edges of said film at the side of said package;
   a preheater for heating the film before the first seal is formed comprising at least one heated roller wherein the opposite edges of the film are in contact with the heated roller; and
   a second sealer for cross sealing said film approximately perpendicular to said longitudinal seal, at the end of said package, whereby the longitudinal seal made by said first sealer and the cross seal made by said second sealer intersect at a corner of said package.

15. The apparatus of claim 14, wherein said first sealer longitudinally seals said opposite edges of said film in a plane, and wherein said second sealer cross seals said film approximately in said plane.

16. The apparatus of claim 14, further comprising a device for pressing excess gas out of said package before said package is completely sealed.

17. The apparatus of claim 14, wherein said film comprises barrier film and said longitudinal seal and said cross seal are substantially hermetic, and further comprising a gas supply device for modifying the atmosphere in said package.

18. The apparatus of claim 14, wherein said film comprises stretch or stretch/shrink film.

19. The apparatus of claim 14, wherein said preheater includes a heated sealing roller having a first axis of rotation and a sealing bed roller having a second axis of rotation, the edges of said film adapted to be pressed together between said sealing roller and said sealing bed roller at a sealing point along a line connecting said first axis of rotation and said second axis of rotation to thereby seal said film edges, said sealing roller and said sealing bed roller being configured such that said film edges are in thermal contact with said sealing roller prior to said sealing point, said sealing roller thereby preheating said film edges prior to sealing said edges at said sealing point.

20. The apparatus of claim 19, wherein said preheater further includes an intake roller positioned upstream of said sealing bed roller and adapted to place said film edges in thermal contact with said sealing roller upstream of said sealing point.

21. An apparatus for packaging food items in a modified gaseous atmosphere, comprising:
   a barrier film dispenser;
   a forming device for receiving said film from said dispenser and forming said film into a tube into which an item is placed, said film being formed such that the edges of said film are oriented at the side of the item;
   a gas flush system for flushing out the air in said tube and replacing it with a predetermined gas or mixture of gases;
   a longitudinal sealing device for forming a substantially hermetic longitudinal seal in said edges of said film at the side of said item comprising a thermal seal roller assembly and an adjacent cooling assembly; and
   a cross sealing device for forming a substantially hermetic cross seal in said film at an angle to said longitudinal seal.

22. The apparatus of claim 21, wherein said item and said film formed around said item comprise a package, and wherein said longitudinal seal and said cross seal intersect at a corner of said package.

23. The apparatus of claim 21, wherein said thermal seal roller assembly comprises an intake roller pressed against a first sealing roller, and a second sealing roller pressed against said first sealing roller at a point downstream from the point at which said intake roller presses against said first sealing roller, whereby said film is lightly pressed against said first sealing roller between said intake roller and said second sealing roller.

24. The apparatus of claim 21, wherein said cooling assembly comprises a cooling roller pressed against a cooling plate.

25. The apparatus of claim 21, wherein said longitudinal seal is made in a plane and said cross seal is also made in said plane.

26. The apparatus of claim 21, further comprising a heat shrink tunnel adapted to shrink said film tightly around said item.

27. The apparatus of claim 21, wherein said preheating device includes a heated sealing roller having a first axis of rotation and a sealing bed roller having a second axis of rotation, the edges of said film adapted to be pressed together between said sealing roller and said sealing bed roller at a sealing point along a line connecting said first axis of rotation and said second axis of rotation to thereby seal said film edges, said sealing roller and said sealing bed roller being configured such that said film edges are in thermal contact with said sealing roller prior to said sealing point, said sealing roller thereby preheating said film edges prior to sealing said edges at said sealing point.

28. The apparatus of claim 27, wherein said preheating device further includes an intake roller positioned upstream of said sealing bed roller and adapted to place said film edges in thermal contact with said sealing roller upstream of said sealing point.

29. A horizontal form fill packaging apparatus for sealing an item in a package of film, comprising:
   a film dispenser for dispensing folded film;
   a film forming plow disposed adjacent to said film dispenser for receiving said dispensed film and spreading apart the two layers of said film in preparation for the reception of said item;
   an input conveyor disposed adjacent to said film forming plow for depositing said item between said film layers, said item and film layers forming a package;
   means for moving said package through said packaging apparatus;
   a guide disposed at the side of said package, adapted to catch the edges of said film and bring said edges together, thereby forming said film layers into a closed tube around said item;
   a rotary thermal sealer disposed adjacent to said guide for forming a continuous longitudinal seal in said edges of said film;
   a cooling roller disposed adjacent to said rotary thermal sealer for cooling said longitudinal seal soon after said longitudinal seal is made to thereby approximate a hermetic longitudinal seal; and a cross sealer oriented to form a cross seal in said film layers after said longitudinal seal is made, said cross seal being substantially perpendicular to and in the same plane as said longitudinal seal, whereby the intersection of said longitudinal seal and said cross seal is located in the corner of said package through substantially two layers of said film.

30. A method for heat sealing film, comprising the steps of:
dispensing film;
forming said film in a tube to allow the insertion of said item;
inserting said item into said tube;
preheating said film by pressing it against a first sealing roller, between a first point and a second point on said first sealing roller; and
sealing said film at said second point through heat and pressure.

31. The method for heat sealing film of claim 30, wherein said film is introduced to said first sealing roller at said first point by being pressed between an intake roller and said first sealing roller at said first point.

32. The method for heat sealing film of claim 30, wherein said film is sealed at said second point by a second sealing roller pressing against said first sealing roller.

33. The method for heat sealing film of claim 30, further comprising the step of cooling said film immediately after it is sealed at said second point.

34. A method for packaging an item, comprising the steps of:
dispensing film;
forming said film in a tube to allow the insertion of said item;
inserting said item into said tube;
drawing the opposite edges of said film together at the wide of said item;
preheating the edges of the film;
longitudinally sealing said opposite edges of said film; and
cross sealing said film at an angle to said longitudinal seal, whereby said cross seal and said longitudinal seal intersect at the corner of said package;
wherein the step of preheating includes the step of placing the film in thermal contact with a heated sealing roller between a first point and a second point on said heating roller, and said step of longitudinally sealing includes the step of sealing said film at said second point on said heated roller, through the application of heat and pressure.

35. The method of claim 34, wherein the step of longitudinally sealing includes sealing said film in a plane, and wherein the step of cross sealing includes sealing said film in said plane.

36. The method of claim 34, wherein the step of cross sealing includes sealing through substantially two layers of film at the intersection of said cross seal and said longitudinal seal.

37. The method of claim 34, wherein the steps of longitudinally sealing and cross sealing said film include sealing said film substantially hermetically.

38. The method of claim 34, wherein the step of longitudinally sealing includes the steps of preheating the edges of said film, thermally sealing the edges of said film, and quickly cooling said seal after it is made.

39. A method for packaging an item, comprising the steps of:

surrounding said item with a sheet of film, thereby forming a package having at least one open end and an open longitudinal seam formed by the opposite edges of said sheet of film;
sealing said longitudinal seam by preheating said edges by passing the edges over at least one heated roller, pressing said edges against each other and applying heat; and
sealing said open end in a linear cross seal through pressure and heat, such that said longitudinal seal intersects paid cross seal at one end of said cross seal, whereby the intersection of said longitudinal seal and said cross seal forms a corner of said package.

40. The method of claim 39, wherein said package has two open ends before sealing.

41. The method of claim 39, wherein said longitudinal seal and said cross seal are substantially hermetically sealed.

42. The method of claim 39, wherein the step of longitudinally sealing includes the steps of preheating, thermally sealing, and quickly cooling the edges of said film.

43. The method of claim 39, wherein the step of surrounding includes the step of surrounding the product in stretch film, and further comprising the step of folding down any excess film at said cross seam against said item.

44. A packaging apparatus for heat sealing film, comprising:
a film dispenser;
a film forming device for receiving film from said dispenser and for forming an enclosure into which an item to be packaged is inserted; and
a sealing apparatus comprising:
an intake roller;
a first sealing roller pressed against said intake roller at first point, said film entering said apparatus at said first point;
a second sealing roller pressed against said first sealing roller at a second point, said film being sealed through heat and pressure at said second point;
whereby said film is pressed against said first sealing roller between said first and second points, thereby preheating said film before sealing.

45. The sealing apparatus of claim 44, wherein said intake roller is disposed at an angle relative to vertical in front of said first sealing roller, and said second sealing roller is disposed at an angle relative to vertical behind said first sealing roller.

46. The sealing apparatus of claim 44, further comprising a cooling roller pressed against a cooling plate disposed behind said first and second sealing rollers, whereby said film is quickly cooled after sealing.

47. A method for packaging food items in a modified gaseous atmosphere, comprising the steps of:
dispensing a barrier film;
forming said film into a tube into which an item is placed, said film being formed such that the edges of said film are oriented at the side of said item;
flushing the air out of said tube and replacing it with a predetermined gas or mixture of gases;
forming a substantially hermetic longitudinal seal in said edges of said film at the side of said item by preheating said edges along at least one heated roller, and then pressing said edges together while heating said edges; and forming a substantially hermetic cross seal in said film at an angle to and in the same plane as said longitudinal seal.

48. In a packaging apparatus for heat sealing film, said apparatus having a film dispenser and a film forming device for receiving film from said dispenser and for forming an enclosure into which an item to be packaged is inserted, a preheating sealing apparatus comprising:
- a heated sealing roller having a first axis of rotation, and a sealing bed roller having a second axis of rotation, the edges of said film adapted to be pressed together between said sealing roller and said sealing bed roller at a sealing point along a line connecting said first axis of rotation and said second axis of rotation to thereby seal said film edges, said sealing roller and said sealing bed roller being configured relative to said film such that said film edges are in thermal contact with said sealing roller prior to said sealing point along said line, said sealing roller thereby preheating said film edges prior to sealing said edges at said sealing point.

49. The packaging apparatus of claim 48, wherein said preheating sealing apparatus further includes an intake roller positioned upstream of said sealing bed roller and adapted to place said film edges in thermal contact with said sealing roller upstream of said sealing point.

50. An apparatus for packaging items in stretch or stretch film shrink, comprising:
- a film dispenser;
- a film forming device for receiving said film from said dispenser and for forming an enclosure into which an item to be packaged is inserted, said item together with said surrounding film forming a package;
- a first sealer for forming a first seal in said film after said package has been formed;
- a second sealer for forming a second seal in said film substantially perpendicular to said first seal, whereby said second seal is through substantially two layers of film at its intersection with said first seal; and
- a device for folding said second seal and adjacent film against said item.

51. A method for packaging an item, comprising the steps of:
- surrounding said item with a sheet of film, thereby forming a package having at least one open end and an open longitudinal seam formed by the opposite edges of said sheet of film;
- sealing said longitudinal seam by preheating said edges, pressing said edges against each other and applying heat;
- flushing the air from said package before sealing, and replacing said air with a predetermined gas or gases; and
- sealing said open end in a linear cross seal through pressure and heat, such that said longitudinal seal intersects said cross seal at one end of said cross seal, whereby the intersection of said longitudinal seal and said cross seal forms a corner of said package.

52. A method for packaging an item, comprising the steps of:
- surrounding said item with a sheet of film, thereby forming a package having at least one open end and one open longitudinal seam formed by the opposite edges of said sheet of film;
- sealing said longitudinal seam by preheating said edges, pressing said edges against each other and applying heat;
- pressing excess air out of said package just before said package is completely sealed; and
- sealing said open end in a linear cross seal through pressure and heat, such that said longitudinal seal intersects said cross seal at one end of said cross seal, whereby the intersection of said longitudinal seal and said cross seal forms a corner of said package.

53. The method of claim 52 further comprising the step of introducing said package to a heat shrink tunnel after sealing when said film is heat shrink film.

* * * * *

UNITED STATES PATENT AND TRADEMARK OFFICE
CERTIFICATE OF CORRECTION

PATENT NO. : 5,282,349

DATED : February 1, 1994

INVENTOR(S) : Siegel, Martin

It is certified that error appears in the above-identified patent and that said Letters Patent is hereby corrected as shown below:

Column 13, line 38, replace "wide" with --side--.

Column 14, line 11, replace "paid" with --said--.

Signed and Sealed this

Twelfth Day of July, 1994

*Attest:*

BRUCE LEHMAN

*Attesting Officer*     *Commissioner of Patents and Trademarks*